US012308509B2

(12) United States Patent
Lee et al.

(10) Patent No.: US 12,308,509 B2
(45) Date of Patent: May 20, 2025

(54) ANTENNA AND ELECTRONIC DEVICE INCLUDING SAME

(71) Applicant: SAMSUNG ELECTRONICS CO., LTD., Suwon-si (KR)

(72) Inventors: Seokwoo Lee, Suwon-si (KR); Dongryul Shin, Suwon-si (KR); Jiwoo Lee, Suwon-si (KR); Youngwon Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 138 days.

(21) Appl. No.: 17/949,591

(22) Filed: Sep. 21, 2022

(65) Prior Publication Data
US 2023/0080343 A1 Mar. 16, 2023

Related U.S. Application Data

(63) Continuation of application No. PCT/KR2022/012408, filed on Aug. 19, 2022.

(30) Foreign Application Priority Data

Sep. 13, 2021 (KR) .................. 10-2021-0121670

(51) Int. Cl.
*H01Q 21/08* (2006.01)
*H01H 13/14* (2006.01)
*H01Q 1/22* (2006.01)

(52) U.S. Cl.
CPC .......... *H01Q 1/2266* (2013.01); *H01H 13/14* (2013.01); *H01Q 21/08* (2013.01)

(58) Field of Classification Search
None
See application file for complete search history.

(56) References Cited

U.S. PATENT DOCUMENTS 7,231,237 B2  6/2007  Kinezos et al.
8,519,904 B2  8/2013  Hsu et al.
(Continued)

FOREIGN PATENT DOCUMENTS

AU   2019204571 A1   7/2019
CN   107155270 B     10/2019
(Continued)

OTHER PUBLICATIONS

International Search Report and Written Opinion for International Application No. PCT/KR2022/012408; Date of Search: Nov. 17, 2022; with English Translation of Search; 10 pages.
(Continued)

*Primary Examiner* — Dameon E Levi
*Assistant Examiner* — Anh N Ho
(74) *Attorney, Agent, or Firm* — CANTOR COLBURN LLP

(57) ABSTRACT

According to various embodiments, an electronic device may include a housing including at least one opening and made of a metal material, a key button assembly disposed in an inner space of the housing and disposed to be at least partially exposed to an outside through the at least one opening, a support frame disposed beneath the key button assembly in the inner space, an antenna structure fixed beneath the support frame and positioned to at least partially correspond to the at least one opening, the antenna structure including a substrate and at least one antenna element disposed on the substrate, and a wireless communication circuit disposed in the inner space and configured to form a directional beam in a designated frequency band toward the key button assembly through the at least one antenna element.

12 Claims, 10 Drawing Sheets

(56) References Cited

U.S. PATENT DOCUMENTS

| | | |
|---|---|---|
| 8,917,192 B2 | 12/2014 | Choi |
| 9,223,410 B1* | 12/2015 | Tom .......................... G06F 1/16 |
| 9,740,301 B2 | 8/2017 | Kim et al. |
| 10,141,626 B2 | 11/2018 | Tan et al. |
| 11,587,746 B2 | 2/2023 | Lu et al. |
| 2007/0049364 A1 | 3/2007 | Kinezos et al. |
| 2010/0331050 A1 | 12/2010 | Tahk et al. |
| 2012/0081240 A1 | 4/2012 | Choi |
| 2012/0162890 A1 | 6/2012 | Chuang et al. |
| 2012/0212417 A1* | 8/2012 | Chen ................... H01H 13/704 |
| | | 345/168 |
| 2013/0079069 A1* | 3/2013 | Kwon ................. H04B 1/3838 |
| | | 455/575.5 |
| 2015/0146357 A1* | 5/2015 | Chang ..................... H01Q 7/06 |
| | | 361/679.09 |
| 2015/0280310 A1* | 10/2015 | Lee ....................... H01H 13/86 |
| | | 343/702 |
| 2016/0028148 A1* | 1/2016 | Tan ......................... H01Q 1/44 |
| | | 343/702 |
| 2016/0234361 A1 | 8/2016 | Baek et al. |
| 2020/0136268 A1 | 4/2020 | Saeidi et al. |
| 2022/0069443 A1 | 3/2022 | Jeon et al. |

FOREIGN PATENT DOCUMENTS

| | | |
|---|---|---|
| JP | 2004304440 A | 10/2004 |
| KR | 20080039535 A | 5/2008 |
| KR | 20080060768 A | 7/2008 |
| KR | 101676598 B1 | 11/2016 |
| KR | 101678222 B1 | 11/2016 |
| WO | 2020153694 A1 | 7/2020 |
| WO | 2023038319 A1 | 3/2023 |

OTHER PUBLICATIONS

International Search Report and Written Opinion for International Application No. PCT/KR2022/012408; International Filing Date Aug. 19, 2022; Date of Mailing Nov. 18, 2022; 50 Pages.
Extended European Search Report corresponding to Application No. 22867588.0-1201; Dated Sep. 5, 2024.

* cited by examiner

ANTENNA AND ELECTRONIC DEVICE INCLUDING SAME

CROSS-REFERENCE TO RELATED APPLICATIONS

This application is a continuation of International Application No. PCT/KR2022/012408, designating the United States, filed on Aug. 19, 2022, in the Korean Intellectual Property Receiving Office and claiming priority to Korean Patent Application No. 10-2021-0121670, filed on Sep. 13, 2021, the disclosures of all which are incorporated by reference herein in their entireties.

TECHNICAL FIELD

The disclosure relates to antennas and electronic devices including the same.

BACKGROUND ART

In line with development of wireless communication technologies, electronic devices (for example, electronic devices for communication) have become daily necessities, and content use has been increasing exponentially as a result. Network capacities have gradually reached limits due to such a rapid increase in content use, and in order to satisfy wireless data traffic demands that have been increasing since commercialization of $4^{th}$ generation (4G) communication systems, there has been research regarding a communication system (for example, 5th generation (5G), pre-5G communication system, or new radio (NR)) for transmitting and/or receiving signals by using a high-frequency (for example, mmWave) band (for example, 3 GHz-300 GHz band).

DISCLOSURE

Technical Problem

Next-generation wireless communication technologies may substantially transmit/receive radio signals by using frequencies in the range of 3 GHz to 300 GHz. There has been development regarding an efficient disposition structure for overcoming severe free space loss resulting from frequency characteristics and for increasing antenna gain, and a new antenna structure (for example, antenna module) conforming thereto. An antenna structure may include a plurality of antenna elements (for example, conductive patches or conductive patterns) disposed at an interval in an array type. Such antenna elements may be disposed such that a beam pattern is formed in one direction inside an electronic device. For example, the antenna structure may be disposed such that a beam pattern is formed in the inner space of the electronic device toward at least a part of the front surface, the rear surface, and/or a side surface.

Recently, electronic devices (for example, laptop PC or tablet PC) may include a housing made of a metal material in order to reinforce rigidity and improve design aesthetics. If an antenna structure is applied inside such a housing made of a metal material, the area corresponding to the antenna structure may be replaced with a nonconductive area partially made of a nonconductive material (for example, polymer) in order to reduce radiation performance degradation. Such a nonconductive area may degrade the design aesthetics of the electronic device, and may weaken the rigidity of the housing. Moreover, considering that electronic devices are becoming slimmer, the space inside an electronic device, in which an antenna structure can be disposed without degradation of radiation performance due to interference of other electronic components, may gradually decrease.

Problems to be solved by the disclosure are not limited to the above-mentioned problems, and may be variously expanded without deviating from the idea and scope of the disclosure.

Technical Solution

Various embodiments of the disclosure may provide an antenna having a disposition structure which may help improve aesthetic appeal, and an electronic device including the same.

Various embodiments of the disclosure may provide an antenna having a disposition structure which may help improve and/or reinforce rigidity, and an electronic device including the same.

Various embodiments of the disclosure may provide an antenna having an efficient disposition structure in connection with other electronic components, and an electronic device including the same.

According to various embodiments, an electronic device may include a housing including at least one opening, the housing made of a metal material, a key button assembly disposed in an inner space of the housing and disposed to be at least partially exposed to an outside through the at least one opening, a support frame disposed beneath the key button assembly in the inner space, an antenna structure fixed beneath the support frame and positioned to at least partially correspond to the at least one opening, the antenna structure including a substrate and at least one antenna element disposed on the substrate, and a wireless communication circuit disposed in the inner space and configured to form a directional beam in a designated frequency band toward the key button assembly through the at least one antenna element.

According to various embodiments, an electronic device may include a housing including a first plate including at least one opening, a second plate facing in an opposite direction to the first plate, and a side member surrounding a space between the first plate and the second plate, the housing being made of a metal material, a key button assembly disposed in the space and including at least one key button disposed to be at least partially exposed to an outside through the at least one opening, a conductive support frame disposed between the key button assembly and the second plate so as to support the key button assembly, an antenna structure fixed beneath the support frame and positioned to at least partially correspond to the at least one opening, the antenna structure including a substrate fixed to the conductive support frame through a conductive support member and at least one antenna element disposed on the substrate, and a wireless communication circuit disposed in the inner space and configured to form a directional beam in a designated frequency band toward the key button assembly through the at least one antenna element, wherein the conductive support frame includes at least one through-hole positioned to overlap or align with the at least one antenna element when viewed from above.

Advantageous Effects

Electronic devices according to embodiments of the disclosure include a disposition structure in which a beam pattern is formed by using a nonconductive area of a key button assembly such that a partial area of a metal housing is not damaged or altered, thereby helping improve design aesthetics and reinforce rigidity, and efficient disposition space utilization may reduce design restrictions in connection with other components of the electronic devices.

Various other advantageous effects identified explicitly or implicitly through the disclosure may be provided.

DESCRIPTION OF DRAWINGS

In connection with description of drawings, identical or similar components may be given identical or similar reference numerals.

MODE FOR INVENTION

Figure 1:
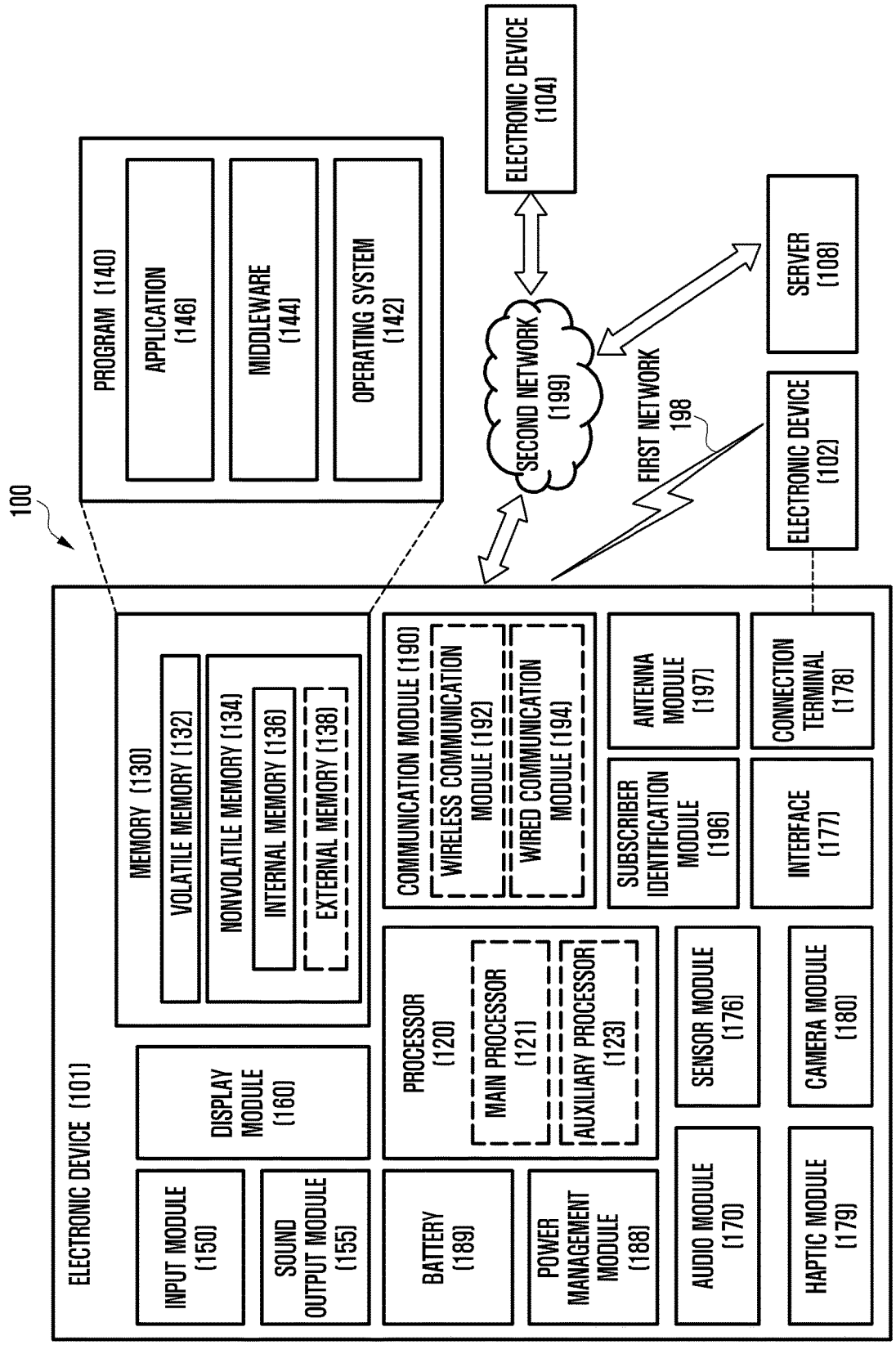
FIG. 1 is a block diagram of an electronic device inside a network environment according to various embodiments of the disclosure.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
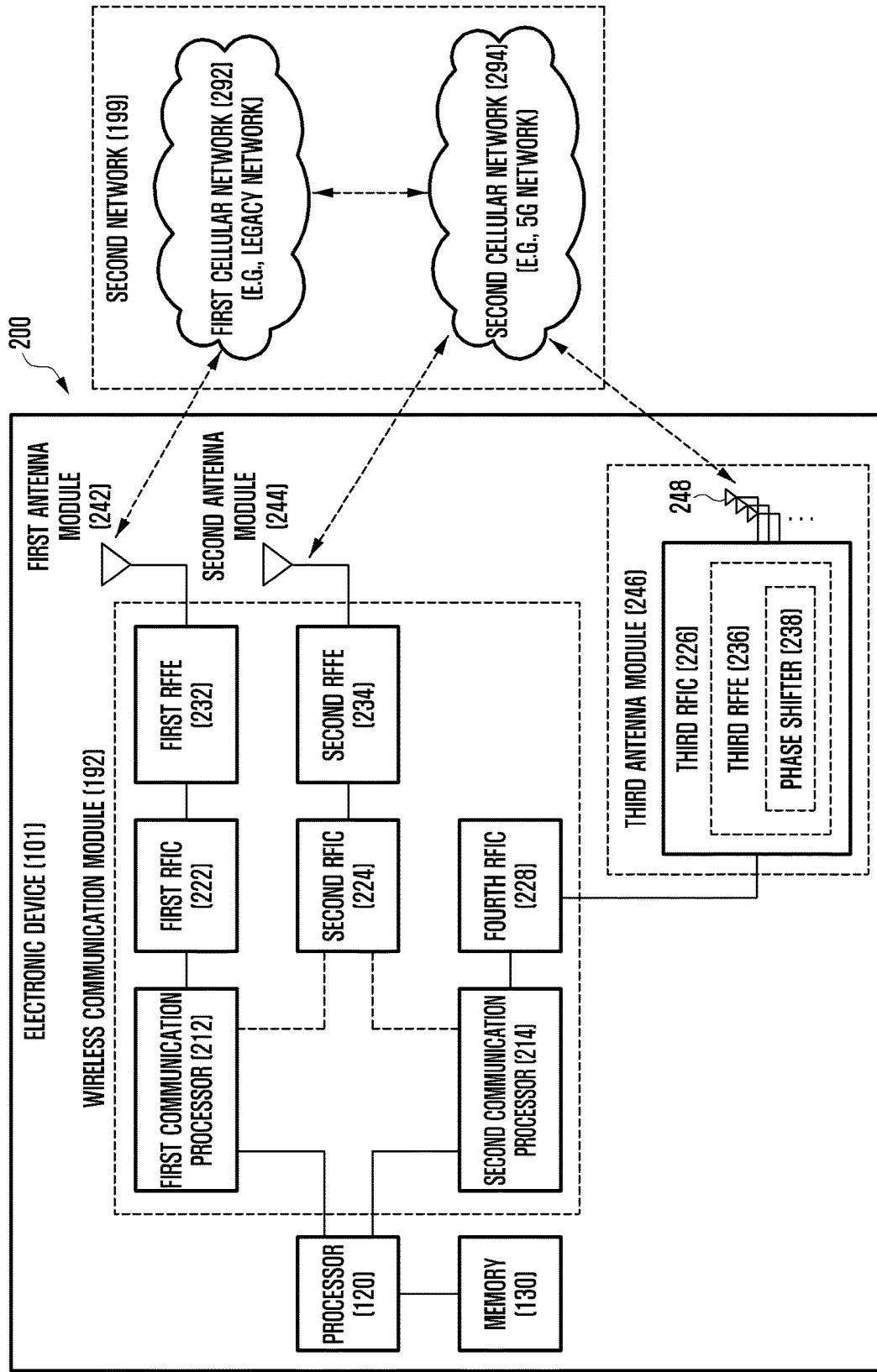
FIG. 2 is a block diagram of an electronic device for supporting legacy network communication and 5G network communication according to various embodiments of the disclosure.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
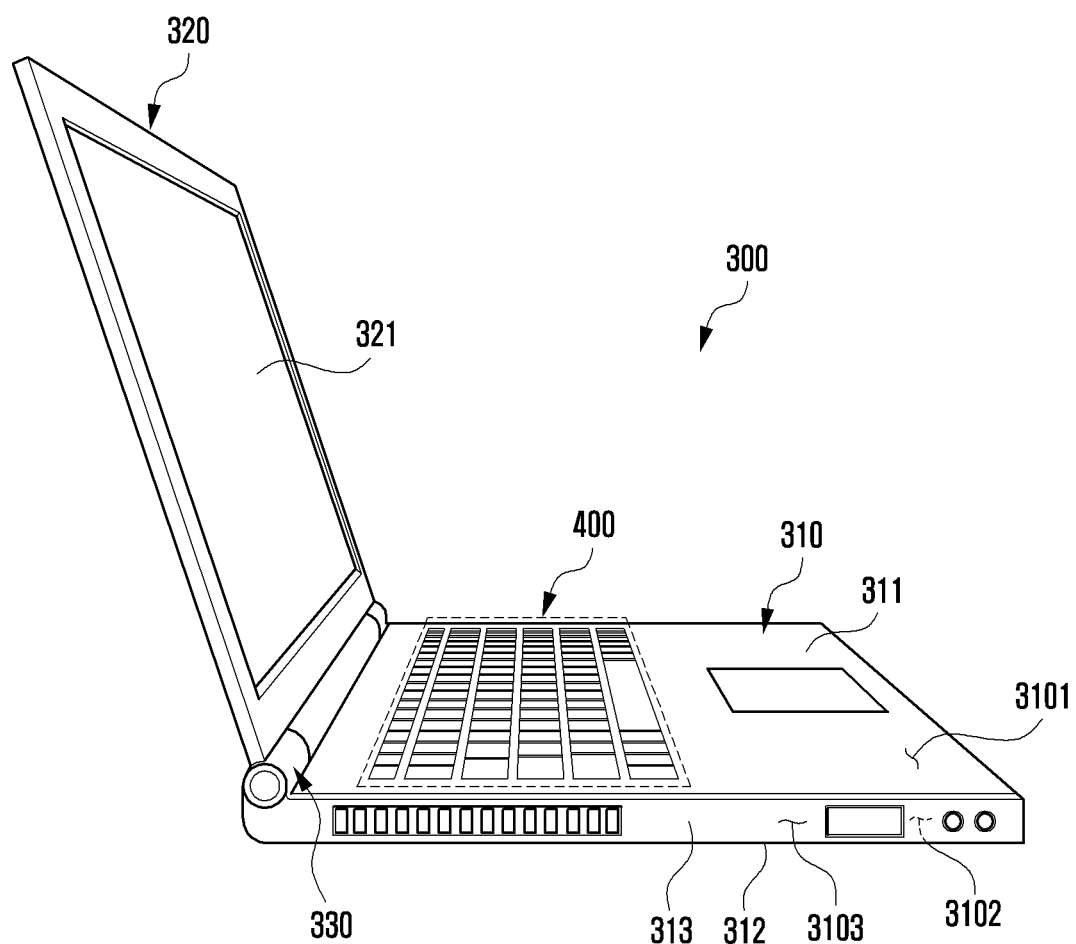
FIG. 3 is a perspective view of an electronic device according to various embodiments of the disclosure.
Figure 4:
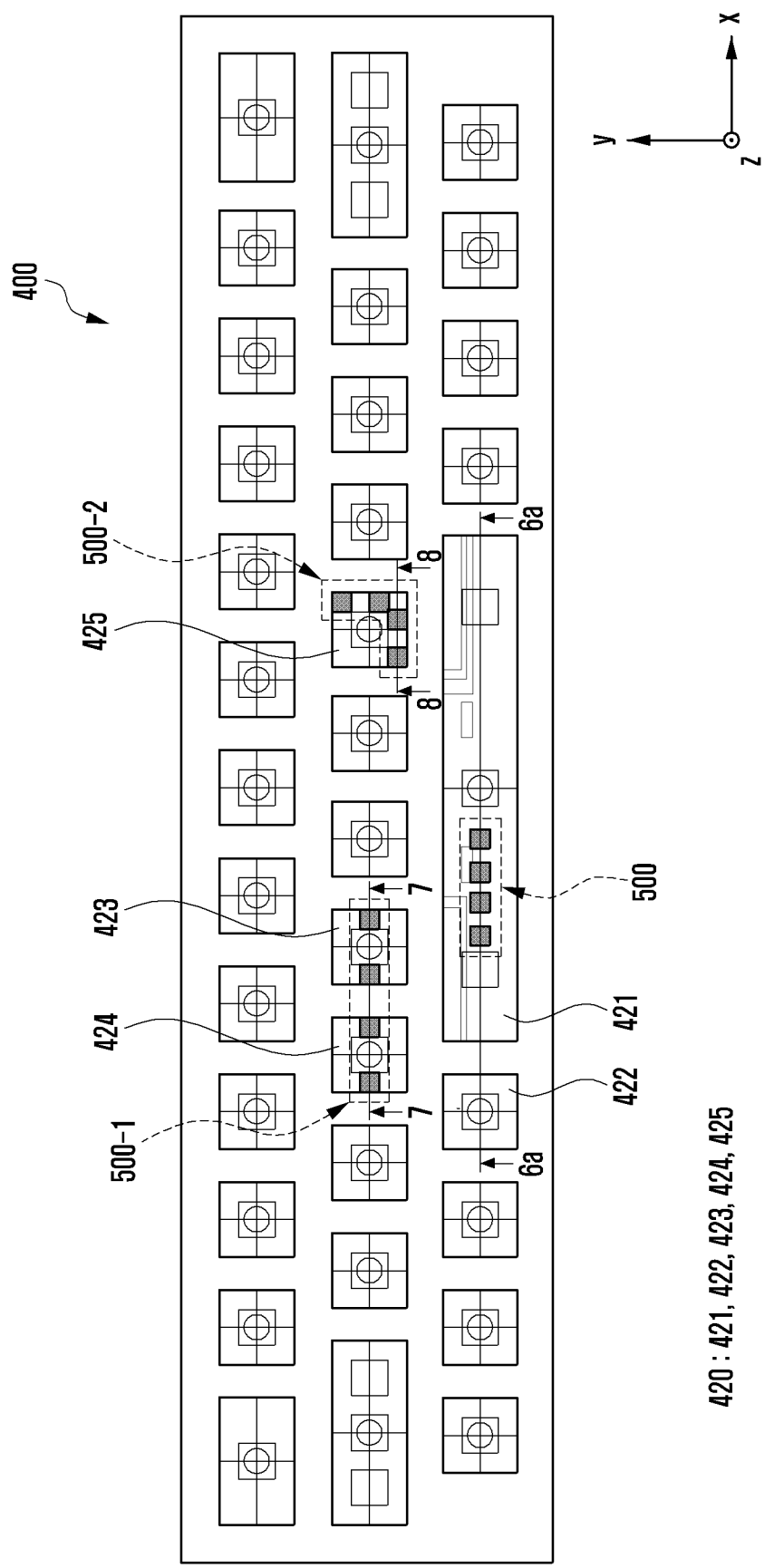
FIG. 4 illustrates a key button assembly of an electronic device according to various embodiments of the disclosure.

FIG. 3 is a perspective view of an electronic device 300 according to various embodiments of the disclosure. FIG. 4 illustrates a key button assembly 400 according to various embodiments of the disclosure that may be implemented in the electronic device 300 of FIG. 3.

The electronic device 300 in FIG. 3 may be at least partially similar to the electronic device 101 in FIG. 1, or may further include other embodiments of the electronic device, including other components and/or alternative arrangements and configurations thereof.

Referring to FIG. 3 and FIG. 4, the electronic device 300 may include a first housing 310 and a second housing 320 foldably connected to the first housing 310 through a hinge device 330 (e.g., hinge). According to an embodiment, the first housing 310 may be substantially made of a metal material. According to an embodiment, the electronic device 300 may include a laptop PC which can be cradled on a cradling structure (for example, desk, table, or other surface). In an embodiment, the electronic device 300 may be replaced with or take the form of a tablet PC or a portable electronic device (for example, mobile terminal) including a single housing 310 (e.g., no hinged second housing 320 is required in accordance with some embodiments). According to an embodiment and as shown in FIG. 3, the second housing 320 may be unfolded in a designated angle range (for example, about 0-360°) with regard to the first housing 310. According to an embodiment, the second housing 320 may be folded so as to face at least a part of the first housing 310.

According to various embodiments, the first housing 310 may include a first plate 311 facing in a first direction (+z axis direction) and constituting at least a part of a front surface 3101 of the electronic device 300, a second plate 312 facing in a second direction (−z axis direction) opposite to the first direction (+z axis direction) and constituting at least a part of a rear surface 3102 of the electronic device 300, and a side member 313 (for example, side bezel) surrounding a space (for example, inner space 3001 shown in FIG. 6A) between the first plate 311 and the second plate 312 and constituting a side surface 3103 of the electronic device 300.

In some embodiments, at least a part of the side member 313 may extend from the first plate 311 and/or the second plate 312 (e.g., integrally formed with one or both of the first and second plates 311, 312). In some embodiments, the first plate 311, the second plate 312, and the side member 313 may be integrally formed. According to an embodiment, the electronic device 300 may include a key button assembly 400 including a plurality of key buttons 420 disposed to be exposed to the outside through the first plate 311, in the first housing 310. The key buttons 420 may comprise a variety of input buttons or actuators for performing functions associated with the electronic device 300. For example, and without limitation, according to an embodiment, the plurality of key buttons 420 may include a key button 421 for inputting various functions (for example, "space" function, "ctrl" or "control" function, "tab" function, "alt" or "alternate" function or "shift" function) and/or key buttons 422, 423, 424, 425 for inputting numbers and/or characters. According to an embodiment, the plurality of key buttons 420 may have different shapes (for example, size and/or length) and/or relative position depending on the input function and/or disposition structure. It will be appreciated that the key buttons 420 (inclusive of key buttons 421, 422, 423, 424, 425) are not exhaustive and those of skill in the art will appreciate that the key buttons 420 may be arranged and programmed as desired or needed for a particularly electronic device and/or application using such electronic device. As such, the illustrative configuration of key buttons 420 is not to be limiting but rather is for example and illustrative purposes only. According to an embodiment, the second housing 320 may include a display 321. In some embodiments, at least one of the plurality of key buttons 420 may be disposed on the side surface 3103 and/or rear surface 3102 to be exposed to the outside (e.g., side or rear toggle buttons, power buttons, input buttons, or the like).

Figure 5:
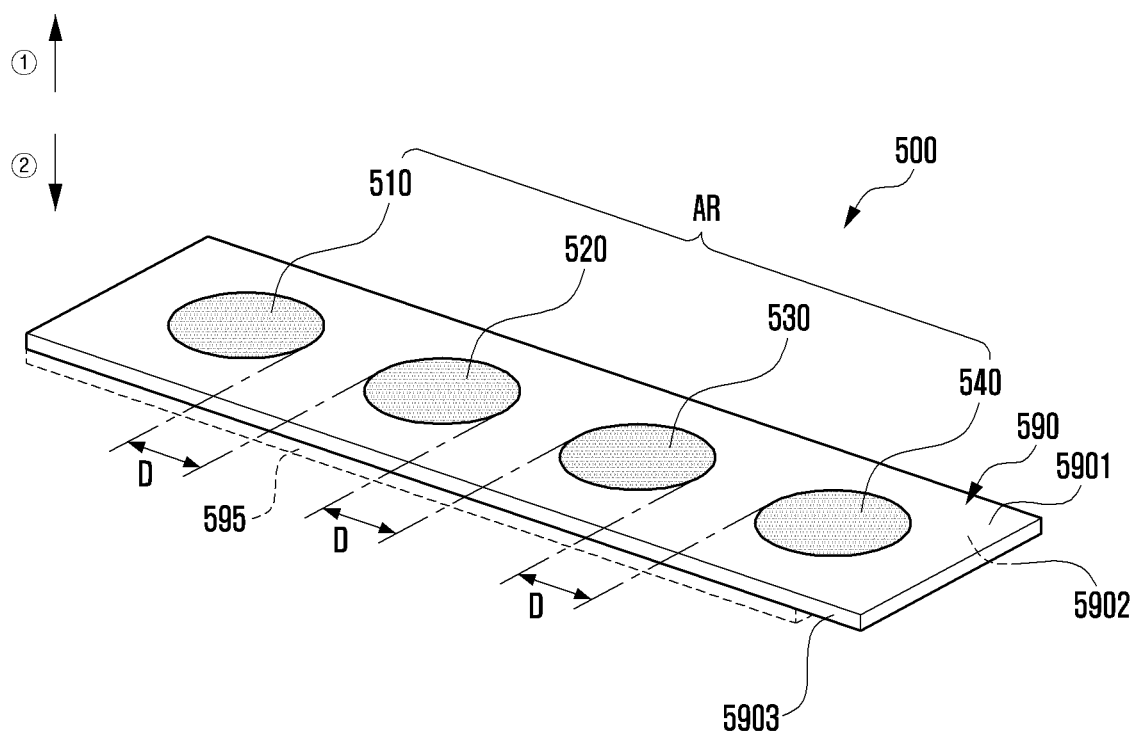
FIG. 5 is a perspective view of an antenna structure according to various embodiments of the disclosure.
Figure 6A:
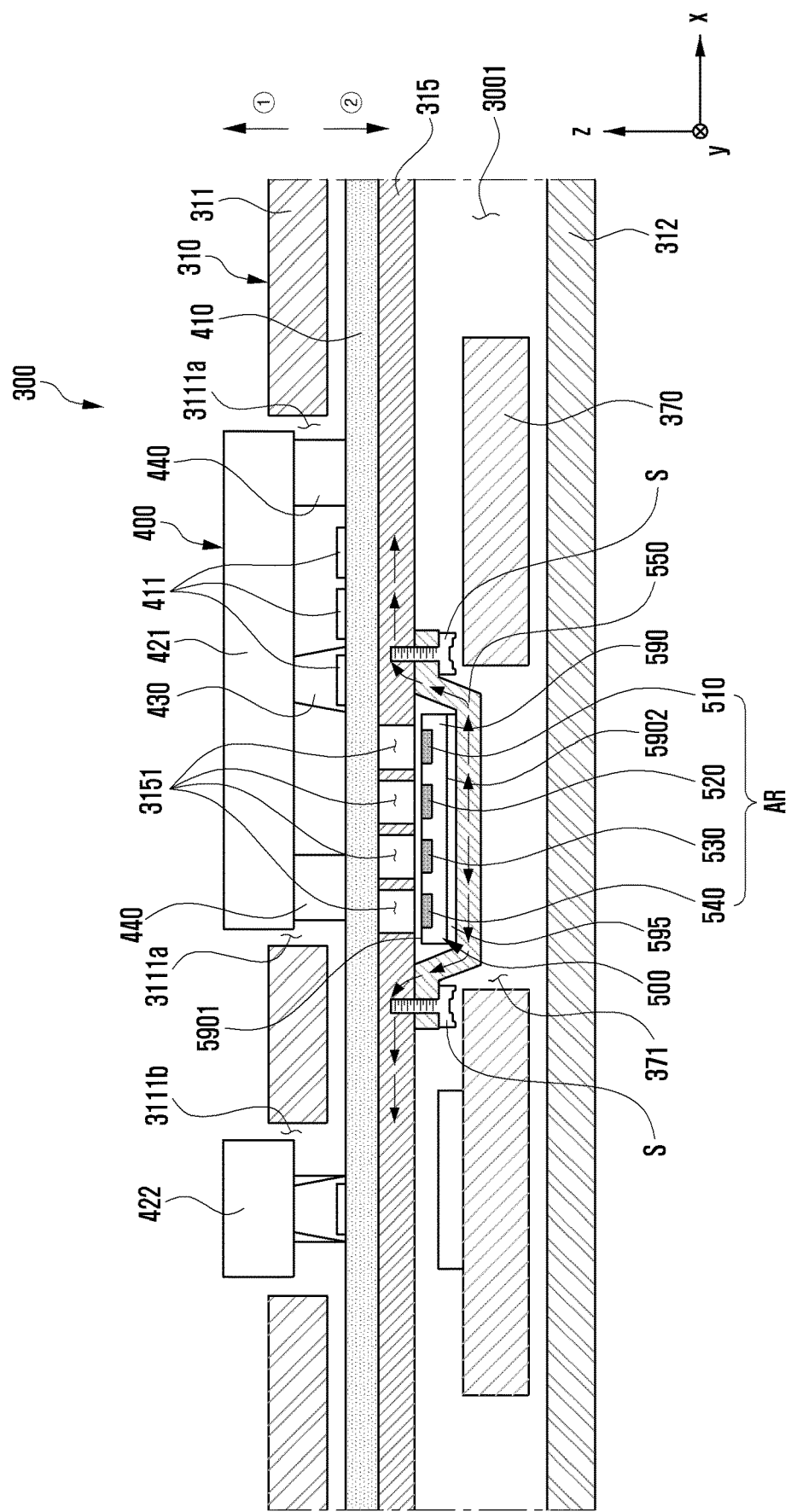
FIG. 6A is a partial sectional view of an electronic device taken along line 6a-6a in FIG. 4 according to various embodiments of the disclosure.
Figure 7:
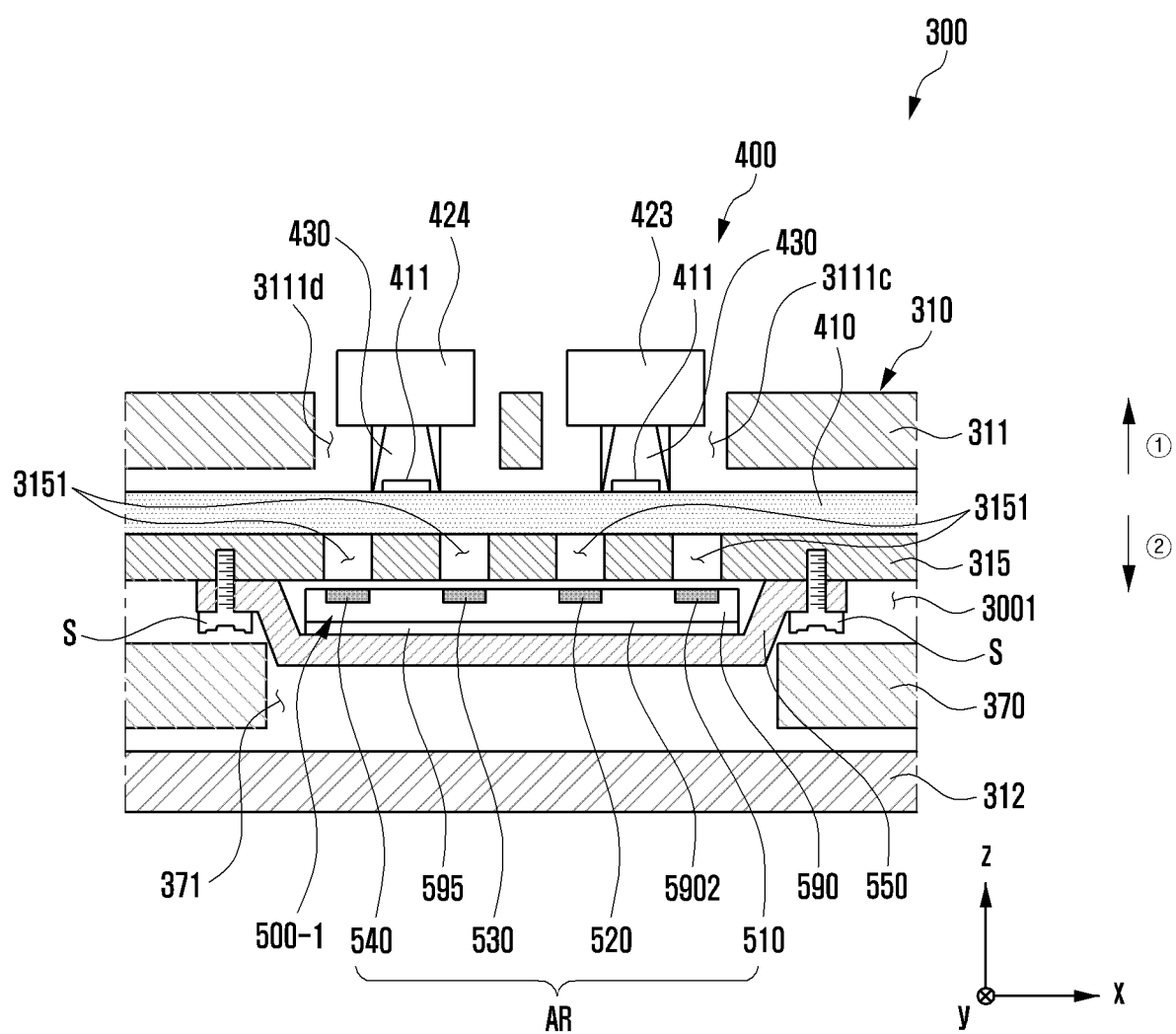
FIG. 7 is a partial section view of an electronic device taken along line 7-7 in FIG. 4 according to various embodiments of the disclosure.
Figure 8:
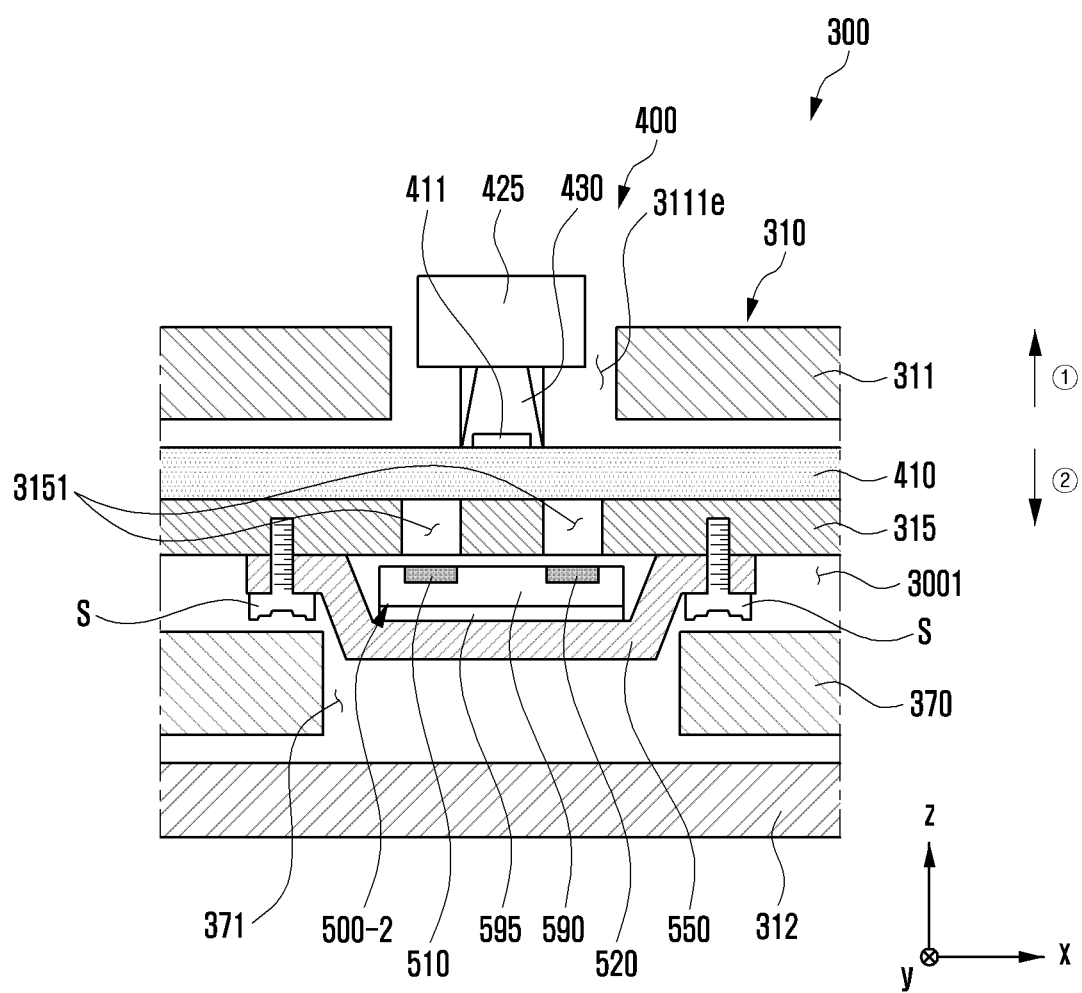
FIG. 8 is a partial section view of an electronic device taken along line 8-8 in FIG. 4 according to various embodiments of the disclosure.

According to various embodiments, and as shown in FIG. 4, the electronic device 300 may include at least one antenna structure 500, 500-1, 500-2 disposed in an inner space defined by the plates 311, 312, 313 (for example, inner space 3001 in FIG. 6A, inner space 3001 in FIG. 7, or inner space 3001 in FIG. 8). According to an embodiment, the at least one antenna structure 500, 500-1, 500-2 may be disposed such that a directional beam is formed in a direction (for example, +z axis direction) in which the key button assembly 400 faces, in the inner space 3001 of the electronic device 300. For example, the at least one antenna structure 500, 500-1, 500-2 may be positioned to overlap or align with at least one key button 421, 423, 424, 425 among the plurality of key buttons 420 when viewed from above the first plate 311. Therefore, a beam pattern generated by the antenna structure 500, 500-1, 500-2 may be radiated in a direction (for example, +z axis direction) in which the first surface 3101 faces, through at least one key button 421, 423, 424, 425. The key buttons 420 (e.g., 421, 423, 424, 425) may be made of a nonconductive material (for example, polymer) to ensure that the key button does not interfere with the generated beam pattern. According to an embodiment, the antenna structure 500 may be positioned to overlap or align with a key button 421 when viewed from above the first plate 311. In some embodiments, the antenna structure 500-1 may be positioned to overlap or align with at least two key buttons 423, 424 when viewed from above the first plate 311. In some embodiments, a plurality of antenna elements (for example, a plurality of antenna elements 510, 520, 530, 540 in FIG. 5) included in the antenna structure 500-2 may be disposed to have an arrangement structure (for example, "L"-type disposition structure) corresponding to a shape of the key button 425.

According to various embodiments, the at least one antenna structure 500, 500-1, 500-2 may include a plurality of antenna elements (for example, a plurality of antenna elements 510, 520, 530, 540 in FIG. 5 arranged as an antenna array AR) having a disposition structure (for example, a disposition interval or an arrangement structure) determined according to the shape of a respective one or more key buttons 421, 423, 424, 425 below the key button assembly 400. For example, as shown in FIG. 4, the antenna structure 500 may be disposed below a key button 421 having a sufficient length corresponding to the disposition length of the plurality of antenna elements 510, 520, 530, 540 (e.g., as shown in FIG. 5). In some embodiments, and as shown in FIG. 4, the antenna structure 500-1 may be disposed below at least two key buttons 423, 424 corresponding to the disposition length of an antenna array AR having another set of the plurality of antenna elements 510, 520, 530, 540. In some embodiments, and as shown in FIG. 4, the antenna structure 500-3 may include another antenna array AR having a plurality of antenna elements 510, 520, 530, 540 having an arrangement shape (for example, "L" shape) corresponding to the shape of a key button 425.

FIG. 5 is a perspective view of an antenna structure according to various embodiments of the disclosure.

The antenna structure 500 in FIG. 5 may be at least partially similar to the third antenna module 246 in FIG. 2, or may further include other embodiments.

Referring to FIG. 5, the antenna structure 500 (for example, an antenna module) may include a substrate 590 (for example, a printed circuit board) and a plurality of antenna elements 510, 520, 530, 540 disposed on the substrate 590 as an array antenna AR. According to an embodiment, the substrate 590 may include a first surface 5901 facing in a first direction (direction θ), a second surface 5902 facing in the opposite direction (for example, direction θ) to the first surface 5901, and a side surface 5903 surrounding a space between the first surface 5901 and the second surface 5902. According to an embodiment, the plurality of antenna elements 510, 520, 530, 540 may be disposed on the first surface 5901 to be exposed, or may be positioned between the first surface 5901 and the second surface 5902 to be closer to the first surface 5901. According to an embodiment, the plurality of antenna elements 510, 520, 530, 540 may include a plurality of conductive patches and/or a plurality of conductive patterns disposed on the substrate 590.

According to various embodiments, the antenna structure 500 may include a wireless communication circuit 595 disposed on or adjacent to (e.g., attached or positioned) the second surface 5902 of the substrate 590 and electrically connected to the plurality of antenna elements 510, 520, 530, 540. According to an embodiment, the wireless communication circuit 595 may be configured to transmit and/or receive radio frequencies in a range of about 3 GHz-300 GHz through the antenna array AR. In some embodiments, the wireless communication circuit 595 may be disposed in the inner space (for example, inner space 3001 in FIG. 6A) of the electronic device (for example, electronic device 300 in FIG. 6A) to be spaced apart from the substrate 590, and may be electrically connected to the substrate 590 through an electric connection member (for example, flexible RF cable (FRC)).

According to various embodiments, the wireless communication circuit 595 electrically connected to the plurality of antenna elements 510, 520, 530, 540 may include an RFIC (for example, RFIC 222, 224, 226, and/or 228 in FIG. 2). For example, the plurality of antenna elements 510, 520, 530, 540 may be disposed on a surface (for example, first surface 5901) of the substrate 590, and an RFIC (for example, RFIC 222, 224, 226, and/or 228 in FIG. 2) may be disposed on another surface (for example, second surface 5902) of the substrate 590.

According to various embodiments, the plurality of antenna elements 510, 520, 530, 540 may include a first antenna element 510, a second antenna element 520, a third antenna element 530, or a fourth antenna element 540 disposed to be spaced apart by a designated interval D. In some embodiments, the designated interval D is the same between adjacent antenna elements. In other embodiments, the designated interval D may be different for some or all antenna elements. According to an embodiment, the plurality of antenna elements 510, 520, 530, 540 may be disposed in a row. In some embodiments, the plurality of antenna elements 510, 520, 530, 540 may be disposed to have a square, grid, or matrix form (for example, 2×2 matrix form). Further, in some embodiments, the plurality of antenna elements 510, 520, 530, 540 may be arranged in a shape that correspondence to a key button(s) (e.g., non-linear). According to an embodiment, the plurality of antenna elements 510, 520, 530, 540 may have a substantially identical shape. In some embodiments, the antenna structure 500 may include an antenna array AR including four antenna elements 510, 520, 530, 540, but is not limited thereto. For example, the antenna structure 500 may include a single antenna element, and may include two, three, or at least five antenna elements as an antenna array AR. In some embodiments, the antenna structure 500 may include a plurality of conductive patterns (for example, dipole antenna) disposed on the substrate 590. In some embodiments, the plurality of conductive patterns (for example, dipole antenna) may be disposed, in connection with a substrate 590 including a plurality of insulating layers, on the same insulating layer as the plurality of antenna elements 510, 520, 530, 540 or on a different insulating layer. In some embodiments, the plurality of conductive patterns (for example, dipole antenna) may be disposed in an area which does not overlap or align with the plurality of antenna elements 510, 520, 530, 540 when viewed from above the first surface 5901. In such a case, no ground layer may be disposed in the corresponding area of the substrate 590 in which the plurality of conductive patterns are disposed. In some embodiments, the plurality of conductive patterns (for example, dipole antenna) may be disposed inside the substrate 590, and the plurality of antenna elements 510, 520, 530, 540 may be disposed on the outer surface (for example, first surface 5901) of the substrate 590 to be exposed. In such a case, a beam pattern may be formed through the conductive patterns in a direction different from the direction in which a beam pattern is formed by the antenna array AR (for example, in perpendicular direction).

According to various embodiments, the plurality of antenna elements 510, 520, 530, 540 may be spaced apart by an interval D of 1 mm-10 mm According to an embodiment, the plurality of antenna elements 510, 520, 530, 540 may be spaced apart by an interval D smaller than the length (for example, diameter) of a single antenna element 510, 520, 530, 540. For example, the plurality of antenna elements 510, 520, 530, 540 may be spaced apart by an interval D smaller than the smallest width of a single antenna element. In some embodiment, each of the plurality of antenna elements 510, 520, 530, 540 may be spaced apart by an interval D determined by the operating frequency band of the antenna array AR.

According to various embodiments, the antenna structure 500 may be disposed such that the first surface 5901 of the substrate 590 faces the first plate (for example, first plate 311 in FIG. 6A) of the electronic device 300 (e.g., horizontal disposition). For example, the antenna structure 500 disposed in the inner space 3001 of the electronic device 300 may be exposed from the first plate 311 of the electronic device 300 or may be configured to form a directional beam in a first direction (direction ①) in which the first plate 311 faces through at least one key button of the protruding key button assembly (for example, key button assembly 400 in FIG. 6A).

FIG. 6A is a partial sectional view of an electronic device taken along line 6a-6a in FIG. 4 according to various embodiments of the disclosure.

Referring to FIG. 6A, the electronic device 300 may include a housing 310 including a first plate 311 made of a metal material and a second plate 312 made of a metal material and spaced apart from the first plate 311; a key button assembly 400 disposed such that the same can be viewed from the outside through at least a partial area of the first plate 311, or can be manipulated; and an antenna structure 500 disposed in an inner space 3001 of the electronic device 300 so as to at least partially overlap or partially align with the first key button 421 of the key button assembly 400 when viewed from above the first plate 311. According to an embodiment, the first key button 421 of the key button assembly 400 may be disposed to be at least partially exposed to the outside through a first opening 3111a formed in the first plate 311. According to an embodiment, the key button assembly 400 may include a second key button 422 exposed to be at least partially exposed to the outside through a second opening 3111b positioned to be adjacent to the first opening 3111a in the first plate 311.

According to various embodiments, the first opening 3111a formed in the first plate 311 may include an empty space or cavity. As another example, the first opening 3111a formed in the first plate 311 may include a nonconductive material. For example, the first opening 3111a formed in the first plate 311 may include a high-molecular material (polymer), glass, and/or ceramic. In some embodiments, at least a part of the first opening 3111a formed in the first plate 311 may be filled with a nonconductive material.

According to various embodiments, the key button assembly 400 may include a first key button 421; a button substrate 410 which is disposed in the inner space 3001 of the electronic device 300, and which includes at least one conductive pad 411; at least one elastic member 440 (for example, skirt made of rubber or silicone) disposed between the button substrate 410 and the first key button 421 so as to provide the first key button 421 with a restoring force; and a switching member 430 (for example, carbon contact point or metal dome) configured to contact the conductive pad 411 when the first key button 421 is pressed, thereby inducing execution of a switching operation. According to an embodiment, when the first key button 421 is pressed, the switching member 430 may contact the conductive pad 411 such that a switching operation is executed. If pressing of the first key button 421 is released, the switching member 430 may return to the original position by means of the elastic member 440. It will be appreciated that other structural mechanisms may be used instead of an elastic member, such as a biased spring, lever, switch, or the like.

According to various embodiments, the electronic device 300 may include a support frame 315 disposed between the button substrate 410 and the second plate 312 in the inner space 3001. According to an embodiment, the support frame 315 may be disposed to support the button substrate 410 and the key button assembly 400. According to an embodiment, the support frame 315 may be made of a metal material.

According to various embodiments, the electronic device 300 may include an antenna structure 500 disposed between the support frame 315 and the second plate 312 in the inner space 3001. According to an embodiment, the antenna structure 500 may include a substrate 590 and a plurality of antenna elements 510, 520, 530, 540 disposed on the substrate 590 at a designated interval as an antenna array AR. According to an embodiment, the substrate 590 may be fixed to the support frame 315 through a conductive support member 550. According to an embodiment, the substrate 590 may be fixed to the support frame 315 through a fastening structure in which the conductive support member 550 is fastened to the support frame 315 through one or more fasteners, illustrated as screws S. In some embodiments, the conductive support member 550 may be fixed to the support frame 315 through bonding, taping, soldering, thermal attachment, or structural coupling. According to an embodiment, the conductive support member 550 may be disposed to correspond to the second surface 5902 of the substrate 590 so as to perform not only a blocking function for blocking noise generated by the wireless communication circuit 595, but also a heat dissipation function for dissipating heat generated by the antenna structure 500 to the support frame 315 made of a metal material. In some embodiments, the support frame 315 may be made of a nonconductive material. In such a case, no through-hole 3151 (described below) may be necessary.

According to various embodiments, the substrate 590 of the antenna structure 500 may be disposed such that the first surface 5901 faces the first key button 421. For example, the support frame 315 may form a beam pattern through a plurality of through-holes 3151 formed in areas corresponding to the antenna elements 510, 520, 530, 540, respectively. Therefore, when viewed from above, the first plate 311, each of the plurality of antenna elements 510, 520, 530, 540, and each of the plurality of through-holes 3151 may be disposed to at least partially overlap or at least partially align. According to an embodiment, the plurality of antenna elements 510, 520, 530, 540 and the plurality of through-holes 3151 may be disposed so as to avoid at least one conductive pad 411 disposed on the button substrate 410. Therefore, the plurality of antenna elements 510, 520, 530, 540 and the plurality of through-holes 3151 may be positioned so as not to overlap or align with the conductive pad 411 when viewed from above the first plate 311. In some embodiments, the plurality of through-holes 3151 may be filled with a nonconductive material (for example, injected material) for waterproofing and/or dustproofing.

According to various embodiments, the electronic device 300 may include a device substrate 370 (for example, main substrate) disposed in the inner space 3001. According to an embodiment, the device substrate 370 may be disposed between the antenna structure 500 and the second plate 312. According to an embodiment, the device substrate 370 may include a recess 371 positioned to correspond to the support member 550 for fixing the antenna structure 500. According to an embodiment, at least a part of the antenna structure 500 and/or the support member 550 may be disposed so as to be at least partially seated in the recess 371 such that the thickness of the electronic device 300 in the vertical direction (for example, z axis direction) is reduced, thereby facilitating slimness. According to an embodiment, the recess 371 may include a hole formed in a corresponding position in the device substrate 370 or a groove formed to have a designated depth to accommodate the support member 550 and the associated elements of the antenna structure 500.

According to an embodiment of the disclosure, the antenna structure 500 may be disposed to form a directional beam in the first direction (direction ①) in which the first plate 311 faces through the first key button 421 such that no separate nonconductive area for the antenna structure 500 needs to be formed in the housing 310 made of a metal material, thereby helping reinforce rigidity of the electronic device 300 and improve design aesthetics. In some embodiments, the first key button 421 may be made of a dielectric material having a low permittivity so as to facilitate formation of a beam pattern of the antenna structure operating in a high-frequency band. In some embodiments, the first key button 421 may be replaced with electronic components (for example, sensor module or connector module) which are disposed in the electronic device 300 to be exposed to the outside, and which include a nonconductive area having a low permittivity such that a beam pattern of the antenna structure 500 can pass. In some embodiments, when the key button 420 is disposed on a side surface (for example, side surface 3103 in FIG. 3) of the electronic device 300, the antenna structure 500 may have a corresponding disposition structure (e.g., vertical disposition).

Figure 6B:
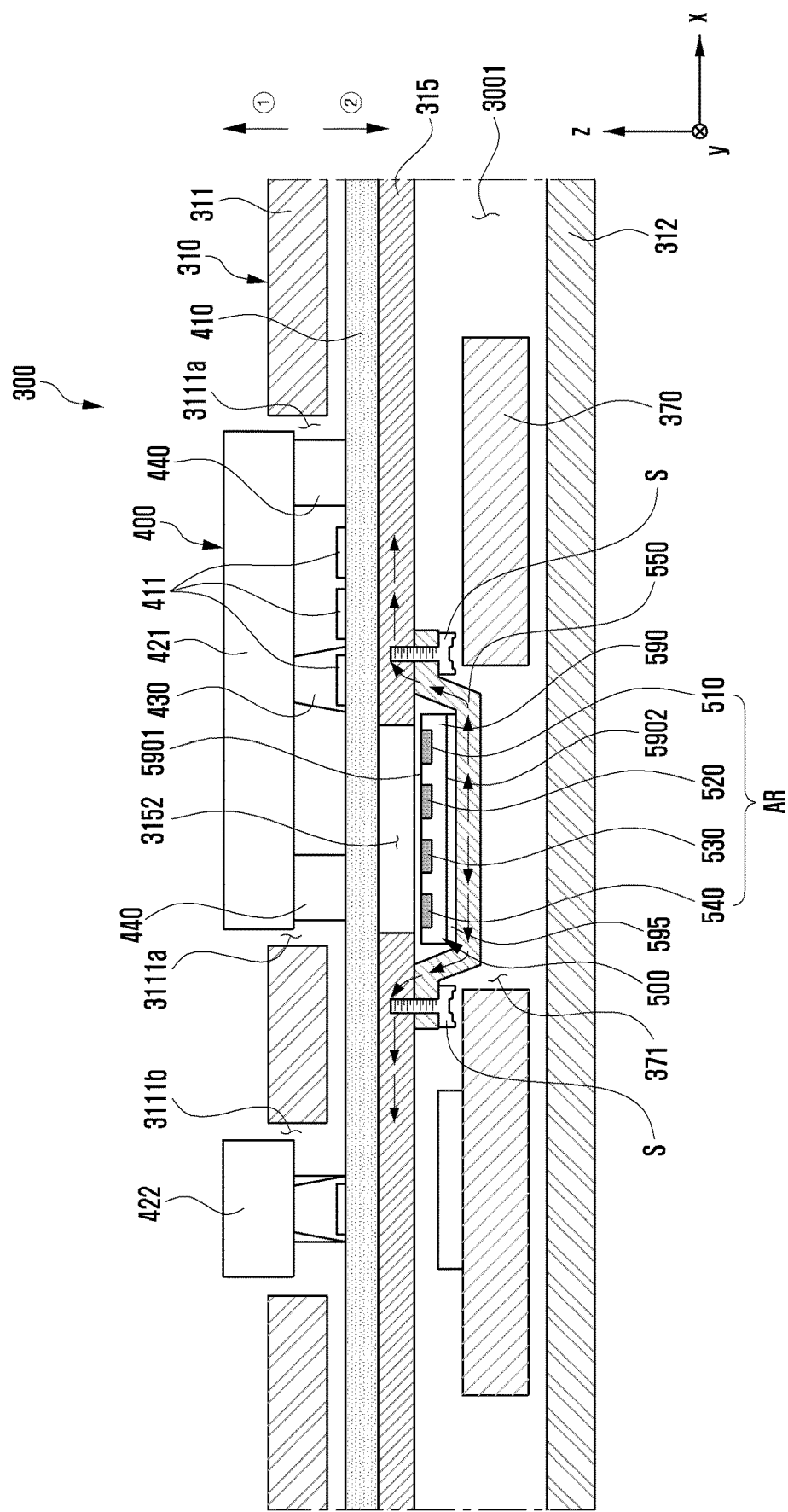
FIG. 6B is a partial sectional view of an electronic device according to an embodiment of the disclosure.
Figure 6C:
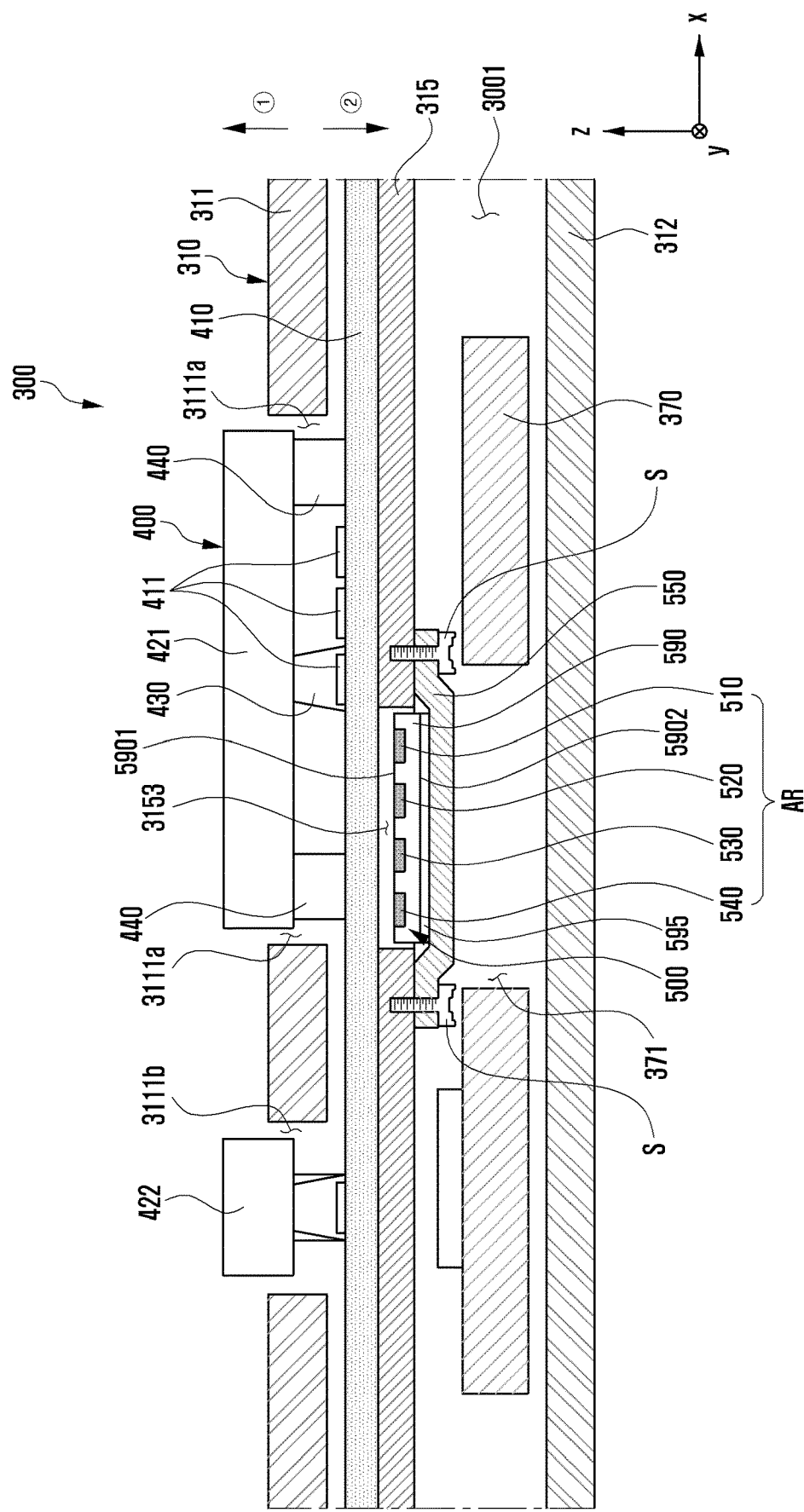
FIG. 6C is a partial sectional view of an electronic device according to an embodiment of the disclosure.

FIG. 6B and FIG. 6C are partial sectional views of electronic devices according to various embodiments of the disclosure.

In connection with describing the electronic device 300 in FIG. 6B and FIG. 6C, elements substantially identical to elements of the electronic device 300 in FIG. 6A are given identical reference numerals, and detailed description thereof may be omitted.

Referring to FIG. 6B, the support frame 315 may include a single through-hole 3152 having a sufficient size to overlap or align with all of plurality of antenna elements 510, 520, 530, 540 when viewed from above the first plate 311. In such a case, the through-hole 3152 may be formed in such a size that the same overlaps or aligns with the antenna elements 510, 520, 530, 540 or overlaps or aligns with the substrate 590 of the antenna structure 500. In some embodiments, the through-hole 3152 may be filled with a nonconductive material.

Referring to FIG. 6C, the substrate 590 of the antenna structure 500 fixed to the support frame 315 through the support member 550 may be disposed so as to at least partially penetrate the through-hole 3153 formed in the support frame 315. In such a case, at least a part of the thickness of the antenna structure 500 may overlap the thickness of the support frame 315, and such disposition may induce reduction in the overall thickness of the electronic device 300, thereby facilitating slimness. In some embodiments, an area of the through-hole 3153, which does not overlap or align with the antenna structure 500, may be filled with a nonconductive material.

FIG. 7 is a partial section view of an electronic device taken along line 7-7 in FIG. 4 according to various embodiments of the disclosure. FIG. 8 is a partial section view of an electronic device taken along line 8-8 in FIG. 4 according to various embodiments of the disclosure.

In connection with describing the electronic device 300 in FIG. 7 and FIG. 8, elements substantially identical to elements of the electronic device 300 in FIG. 6A are given identical reference numerals, and detailed description thereof may be omitted.

Referring to FIG. 7, the antenna structure 500-1 may be positioned to overlap or align with two key buttons 423, 424 when viewed from above the first plate 311. According to an embodiment, the two key buttons 423, 424 may include a third key button 423 disposed to be exposed to the outside through a third opening 3111c formed in the first plate and a fourth key button 424 disposed to be exposed to the outside through a fourth opening 3111d positioned adjacent to the third opening 3111c. According to an embodiment, two antenna elements 510, 520 of the antenna structure 500-1 may be positioned to overlap or align with the third key button 423, when viewed from above the first plate 311, so as to avoid the conductive pad 411. According to an embodiment, two antenna elements 530, 540 of the antenna structure 500-1 may be positioned to overlap or align with the fourth key button 424 adjacent to the third key button 423. In some embodiments, the antenna structure 500-1 may be disposed to overlap or align with three or more key buttons, depending on the number of the antenna elements, size and/or shape of the key buttons, or for other reasons or purposes.

Referring to FIG. 4 and FIG. 8, a plurality of antenna elements 510, 520, 530, 540 of the antenna structure 500-2 may be positioned to overlap or align with the fifth key button 425 when viewed from above the first plate 311. According to an embodiment, the fifth key button 425 may be disposed to be exposed to the outside through a fifth opening 3111e formed in the first plate 311. According to an embodiment, the plurality of antenna elements 510, 520, 530, 540 may be disposed to overlap or align in an "L"-shape along an edge of the fifth key button 425 when viewed from above the key button assembly 400. In some embodiments, the plurality of antenna elements 510, 520, 530, 540 may be disposed to have various arrangement structures other than the illustrated "L"-shape, depending on the shape and/or size of the corresponding key button 420. In some embodiments, the plurality of antenna elements 510, 520, 530, 540 may be disposed in a matrix form (for example, 2×2 matrix form).

Exemplary embodiments of the disclosure have been described in connection with some key buttons 421, 423, 424, 425 in FIG. 4 and disposition structures of antenna structures 500, 500-1, 500-2 corresponding thereto, but are not limited thereto. For example, an antenna structure may be positioned to correspond to at least one key button having no reference numeral in FIG. 4.

According to various embodiments, an electronic device (for example, electronic device 300 in FIG. 6A) may include a housing (for example, housing 310 in FIG. 6A) including at least one opening (for example, opening 3111 in FIG. 6A) and made of a metal material, a key button assembly (for example, key button assembly 400 in FIG. 6A) disposed in an inner space (for example, inner space 3001 in FIG. 6A) of the housing and disposed to be at least partially exposed to an outside through the at least one opening, a support frame (for example, support frame 315 in FIG. 6A) disposed beneath the key button assembly in the inner space, an antenna structure (for example, antenna structure 500 in FIG. 6A) fixed beneath the support frame and positioned to at least partially correspond to the at least one opening, the antenna structure including a substrate (for example, substrate 590 in FIG. 6A) and at least one antenna element (for example, antenna elements 510, 520, 530, 540 in FIG. 6A) disposed on the substrate, and a wireless communication circuit (for example, wireless communication circuit 595 in FIG. 6A) disposed in the inner space and configured to form a directional beam in a designated frequency band toward the key button assembly through the at least one antenna element.

According to various embodiments, the key button assembly may include at least one key button exposed through the opening, a button substrate disposed between the key button and the support frame and including at least one conductive pad, and a switching member disposed between the key button and the button substrate and configured to contact the conductive pad through a pressing operation of the key button, and the at least one antenna element may be positioned to overlap or align with the at least one key button when viewed from above.

According to various embodiments, the at least one antenna element may be disposed to overlap or align with one key button when viewed from above.

According to various embodiments, the at least one antenna element may be disposed to overlap or align with two or more key buttons when viewed from above.

According to various embodiments, the at least one antenna element may have an arrangement structure corresponding to a shape of the at least one key button when viewed from above.

According to various embodiments, the at least one antenna element may be disposed not to overlap or align with the at least one conductive pad when viewed from above.

According to various embodiments, the support frame may be made of a metal material, and the support frame may include at least one through-hole positioned to overlap or align with the at least one antenna element when viewed from above.

According to various embodiments, the at least one antenna element may include a plurality of antenna elements disposed on the substrate at a designated interval, and the at least one through-hole may include a plurality of through-holes disposed to overlap or align with the plurality of antenna elements, respectively, when viewed from above.

According to various embodiments, the at least one antenna element may include a plurality of antenna elements disposed on the substrate at a designated interval, and the at least one through-hole may include a single through-hole disposed to overlap or align with all of the plurality of antenna elements when viewed from above.

According to various embodiments, the support frame may include a through-hole formed at least partially, and at least a part of the substrate may be disposed so as to at least partially penetrate the through-hole.

According to various embodiments, the substrate may be fixed to the support frame through a conductive support member.

According to various embodiments, the conductive support member may be fixed to the support frame through screw fastening, soldering, bonding, taping, thermal attachment, or structural coupling.

According to various embodiments, the electronic device may further include a device substrate disposed in the inner space and including a recess, and the conductive support member may be disposed so as to be at least partially seated in the recess.

According to various embodiments, heat generated by the antenna structure may be transferred to the support frame through the conductive support member.

According to various embodiments, the designated frequency band may include a range of 3 GHz-300 GHz.

According to various embodiments, an electronic device (for example, electronic device 300 in FIG. 6A) may include a housing (for example, housing 310 in FIG. 6A) including a first plate (for example, first plate 311 in FIG. 6A) including at least one opening (for example, opening 3111 in FIG. 6A), a second plate (for example, second plate 312 in FIG. 6A) facing in an opposite direction to the first plate, and a side member (for example, side member 313 in FIG. 6A) surrounding a space (for example, space 3001 in FIG. 6A) between the first plate and the second plate, the housing being made of a metal material, a key button assembly (for example, key button assembly 400 in FIG. 6A) disposed in the space and including at least one key button (for example, key button 420 in FIG. 6A) disposed to be at least partially exposed to an outside through the at least one opening, a conductive support frame (for example, support frame 315 in FIG. 6A) disposed between the key button assembly and the second plate so as to support the key button assembly, an antenna structure (for example, antenna structure 500 in FIG. 6A) fixed beneath the support frame and positioned to at least partially correspond to the at least one opening, the antenna structure including a substrate (for example, substrate 590 in FIG. 6A) fixed to the conductive support frame through a conductive support member (for example, conductive support member 550 in FIG. 6A) and at least one antenna element (for example, antenna elements 510, 520, 530, 540 in FIG. 6A) disposed on the substrate, and a wireless communication circuit (for example, wireless communication circuit 595 in FIG. 6A) disposed in the inner space and configured to form a directional beam in a designated frequency band toward the key button assembly through the at least one antenna element, and the conductive support frame may include at least one through-hole (for example, through-hole 3151 in FIG. 6A) positioned to overlap or align with the at least one antenna element when viewed from above.

According to various embodiments, the at least one antenna element may include a plurality of antenna elements disposed on the substrate at a designated interval, and the at least one through-hole may include a plurality of through-holes disposed to overlap or align with the plurality of antenna elements, respectively, when viewed from above.

According to various embodiments the at least one antenna element may include a plurality of antenna elements disposed on the substrate at a designated interval, and the at least one through-hole may include a single through-hole disposed to overlap or align with all of the plurality of antenna elements when viewed from above.

According to various embodiments at least a part of the substrate may be disposed so as to at least partially penetrate the at least one through-hole.

According to various embodiments the at least one antenna element may be disposed to overlap one key button or disposed to overlap or align with two or more key buttons when viewed from above.

Embodiments of the disclosure disclosed in this specification and drawings are only specific examples presented to easily describe technical details of embodiments of the disclosure and to help understanding of embodiments of the disclosure, and are not intended to limit the scope of embodiments of the disclosure. therefore, the scope of embodiments of the disclosure is to be interpreted as incorporating all changed or modified forms derived based on the technical idea of various embodiments of the disclosure, in addition to embodiments disclosed herein.

What is claimed is:

1. An electronic device comprising:
  a housing comprising at least one opening and made of a metal material;
  a key button assembly disposed in an inner space of the housing and disposed to be at least partially exposed to an outside through the at least one opening;
  a conductive support frame disposed beneath the key button assembly in the inner space;
  an antenna structure fixed beneath the conductive support frame and positioned to at least partially correspond to the at least one opening, the antenna structure comprising
    a substrate, and
    a plurality of antenna elements disposed on the substrate at a designated interval; and
  a wireless communication circuit disposed in the inner space and configured to form a directional beam in a designated frequency band toward the key button assembly through the plurality of antenna elements,
  wherein the conductive support frame includes a plurality of through-holes disposed to overlap the plurality of antenna elements, respectively, when viewed from above.

2. The electronic device of claim 1, wherein the key button assembly comprises:
  at least one key button exposed through the at least one opening;
  a button substrate disposed between the at least one key button and the conductive support frame and comprising at least one conductive pad; and
  a switching member disposed between the at least one key button and the button substrate and configured to contact the at least one conductive pad through a pressing operation of the at least one key button,
  wherein the plurality of antenna elements are positioned to overlap the at least one key button when viewed from above.

3. The electronic device of claim 2, wherein the at least one key button includes two or more key buttons and, wherein the plurality of antenna elements are disposed to overlap the two or more key buttons when viewed from above.

4. The electronic device of claim 2, wherein the plurality of antenna elements have an arrangement structure corresponding to a shape of the at least one key button when viewed from above.

5. The electronic device of claim 2, wherein the plurality of antenna elements are disposed not to overlap the at least one conductive pad when viewed from above.

6. The electronic device of claim 2, wherein the substrate is fixed to the conductive support frame by a conductive support member.

7. The electronic device of claim 6, wherein the conductive support member is fixed to the conductive support frame through at least one of screw fastening, soldering, bonding, taping, thermal attachment, or structural coupling.

8. The electronic device of claim 6, further comprising a device substrate disposed in the inner space and comprising a recess,
  wherein the conductive support member is disposed so as to be at least partially seated in the recess.

9. The electronic device of claim 6, wherein heat generated by the antenna structure is transferred to the conductive support frame through the conductive support member.

10. The electronic device of claim 1, wherein the designated frequency band comprises a range of 3 GHz-300 GHz.

11. An electronic device comprising:
a housing comprising a first plate comprising at least one opening, a second plate facing in an opposite direction to the first plate, and a side member surrounding an inner space between the first plate and the second plate, the housing being made of a metal material;
a key button assembly disposed in the inner space and comprising at least one key button disposed to be at least partially exposed to an outside through the at least one opening;
a conductive support frame disposed between the key button assembly and the second plate so as to support the key button assembly;
an antenna structure fixed beneath the conductive support frame and positioned to at least partially correspond to the at least one opening, the antenna structure comprising
    a substrate fixed to the conductive support frame by a conductive support member, and
    a plurality of antenna elements disposed on the substrate at a designated interval; and
a wireless communication circuit disposed in the inner space and configured to form a directional beam in a designated frequency band toward the key button assembly through the plurality of antenna elements,
wherein the conductive support frame comprises a plurality of through-holes positioned to overlap the plurality of antenna elements, respectively, when viewed from above.

12. The electronic device of claim 11, wherein the plurality of antenna elements are disposed to overlap the at least one key button when viewed from above.

* * * * *